(12) United States Patent
Nishihara

(10) Patent No.: US 6,771,531 B2
(45) Date of Patent: Aug. 3, 2004

(54) MEMORY DEVICE AND MEMORY SYSTEM USING SAME

(75) Inventor: Toshiyuki Nishihara, Kanagawa (JP)

(73) Assignee: Sony Corporation, Tokyo (JP)

(*) Notice: Subject to any disclaimer, the term of this patent is extended or adjusted under 35 U.S.C. 154(b) by 51 days.

(21) Appl. No.: 10/350,039

(22) Filed: Jan. 24, 2003

(65) Prior Publication Data
US 2003/0147269 A1 Aug. 7, 2003

(30) Foreign Application Priority Data
Feb. 1, 2002 (JP) .................................... P2002-026180

(51) Int. Cl.[7] .............................................. G11C 11/22
(52) U.S. Cl. ...................................... 365/145; 365/149
(58) Field of Search ................................ 365/145, 149; 711/3, 101, 102, 103

(56) References Cited

U.S. PATENT DOCUMENTS 5,307,304 A * 4/1994 Saito et al. .................. 365/145
6,263,398 B1 * 7/2001 Taylor et al. ................. 711/3

FOREIGN PATENT DOCUMENTS

JP 09-121032 A1 5/1997
JP 11-158632 A1 6/1999

* cited by examiner

Primary Examiner—Vu Anh Le
(74) Attorney, Agent, or Firm—Rader Fishman & Grauer PLLC

(57) ABSTRACT

A memory device including a cross point type ferroelectric memory and a randomly accessible write back type cache memory, where the cross point type ferroelectric memory is accessed via a second memory, and a memory system using the same. By this, data in the cache memory can be freely randomly accessed, the cross point type memory is accessed only at miss hits, and the number of data rewrites is greatly reduced.

18 Claims, 10 Drawing Sheets

MEMORY DEVICE AND MEMORY SYSTEM USING SAME

BACKGROUND OF THE INVENTION

1. Field of the Invention

The present invention relates to a memory device including a non-volatile ferroelectric memory and a memory system using this memory device.

2. Description of the Related Art

Semiconductor memories, particularly FeRAMs using ferroelectric materials, are attracting attention as user-friendly devices providing both high speed access and non-volatile storage and offering the promise of increased capacity in the future.

An FeRAM is small in size and consumes low electric power and, at the same time, is resistant to shock. If progress is made in reducing the bit unit price along with the increase in capacity, it will also has promise as a future recording medium for sound or images.

Particularly, as promising means for improving the degree of integration, Japanese Patent Application No. 11-158632 and Japanese Unexamined Patent Publication (Kokai) No. 09-121032 propose a so-called "cross point type" ferroelectric memory.

FIG. 10 is a circuit diagram of an example of a cross point type ferroelectric memory.

This ferroelectric memory 10 has, as shown in FIG. 10, a memory cell array 11, word driver (WRD DRV) 12, plate (PLT DRV) driver 13, and sense amplifier (S/A) 14.

The memory cell array 11 is comprised of a plurality of (eight in FIG. 10) ferroelectric capacitors FC101 to FC108 forming individual memory cell arranged in a four-row, two-column matrix.

The memory cell array 11 is divided into two cell strings CST11 and CST12.

The cell string CST11 is configured by a pass transistor TR101 comprised of an n-channel MOS transistor and ferroelectric capacitors FC101, FC102, fC103, and FC104 arranged in the same column.

In the cell string CST11, first electrodes of the ferroelectric capacitors FC101, FC102, FC103, and FC104 serving as four memory cells are commonly connected to one node electrode ND11 connected to a bit line BL11 via the pass transistor TR101.

The other electrodes of the ferroelectric capacitors FC101, FC102, FC103, and FC104 are connected to different plate lines PL11, PL12, PL13, and PL14 to thereby enable data to be written independently in the ferroelectric capacitors FC101, FC102, FC103, and FC104 serving as the memory cells.

Note that data of the plurality of ferroelectric capacitors FC101, FC102, FC103, and FC104 sharing the node electrode ND11 is for example accessed all together continuously. Further, the accessed data is amplified by the sense amplifier 14 and rewritten.

The cell string CST12 is configured by a pass transistor TR102 comprised of an n-channel MOS transistor and ferroelectric capacitors FC105, FC106, FC107, and FC108 arranged in the same column.

In the cell string CST12, first electrodes of the ferroelectric capacitors FC105, FC106, FC107, and FC108 serving as four memory cells are commonly connected to one node electrode ND12 connected to a bit line BL12 via the pass transistor TR102.

The other electrodes of the ferroelectric capacitors FC105, FC106, FC107, and FC108 are connected to different plate lines PL11, PL12, PL13, and PL14 to thereby enable data to be independently written in the ferroelectric capacitors FC105, FC106, FC107, and FC108 serving as the memory cells.

Note that the data of the plurality of ferroelectric capacitors FC105, FC106, FC107, and FC108 sharing the node electrode ND12 is for example accessed all together continuously. Further, the accessed data is amplified by the sense amplifier 14 and rewritten.

The gate electrodes of the pass transistors TR101 and TR102 of the cell strings CST11 and CST12 are connected to a common word line WL11.

A word driver 12 supplies for example a power supply voltage $V_{cc}+\alpha$ ($\alpha$ is a voltage not less than the threshold voltage Vth of the pass transistor, for example 1V) to an addressed word line, i.e., WL11 in the example of FIG. 10, and holds the pass transistors in a conductive state in units of cell units.

A plate driver 13 supplies the plate lines PL11 to PL14 addressed at the time of data access with a predetermined voltage 0V or $V_{cc}$ for writing or reading and rewriting data in the ferroelectric capacitor of the addressed memory cell and supplies unselected plate lines with a predetermined voltage $V_{cc}/2$.

The sense amplifier 14 is connected to the bit lines BL11 and BL12, latches, amplifies, and rewrites (refreshes) the data read to the bit lines BL11 and BL12 at the time of writing and reading.

The read operation in the ferroelectric memory 10 having such a configuration is carried out as follows.

For example, when driving the word line WL11 by the word driver 12, fixing the plate lines PL12 to PL14 to 0V by the plate driver 13, and in that state driving the plate line PL11 to $V_{cc}$, the ferroelectric capacitors FC101 and FC105 discharge to the bit lines BL11 and BL12.

The data can be read by sensing the potential difference produced by this by a differential type sense amplifier 14.

Since the cross point type ferroelectric memory has one transistor shared by a plurality of capacitors, the number of elements per bit is effectively decreased. This is effective for reducing costs.

Summarizing the problem to be solved by the invention, as explained above, while a cross point type ferroelectric memory is advantageous from the viewpoint of degree of integration, it has the following limitations.

Namely, in the above cross point type semiconductor memory, since a plurality of capacitors are connected to a common node electrode of the memory string selected by the word line, when writing data into any one capacitor, voltage is also supplied to the unselected capacitors sharing the node electrode (this will be generally referred to as a "disturbance").

The voltage supplied is not large enough to destroy the data by a single time, but if this is supplied a number of times without restraint, the data will gradually deteriorate and finally the data will be destroyed.

Accordingly, the number of disturbances has to be restricted by some measure or another.

In the above Japanese Unexamined Patent Publication (Kokai) No. 09-121032 etc., the memory is designed to be accessed in block units so as to establish an upper limit on the disturbances.

Namely, when any cell is accessed, the other cells in the same memory string which would be affected by a disturbance are also accessed and rewritten in a consecutive sequence.

Accordingly, when the number of cells connected to the common node electrode of a memory string is N, the upper limit of the number of disturbances is N−1 times.

In this case, however, when accessing a certain memory string, the other memory strings cannot be accessed until all of the cells connected to that string finish being read and rewritten.

Accordingly, the application of this to random access applications like that of for example a DRAM is basically impossible or results in very slow operation.

Further, general ferroelectric memories suffer from the problem of "film fatigue". This is the deterioration of the polarization characteristic due to repeated inversion of polarization of the ferroelectric film. The number of rewrites is restricted by this.

In general, the number of rewrites of a ferroelectric film is considered to be to about 1E12 times. With use like a DRAM, therefore, the reliability cannot be guaranteed.

For the above reason, there was the problem that the cross point type ferroelectric memory was very limited in its usage.

SUMMARY OF THE INVENTION

An object of the present invention is to provide a memory device able to make use of the non-volatility and high integration of a cross point type ferroelectric memory and yet able to improve the random accessibility of the same, reduce the number of rewrites, and facilitate control of the upper limit of disturbances and a memory system using the same.

To attain the above object, according to a first aspect of the present invention, there is provided a memory system having a first memory and a second memory, wherein the first memory has at least one bit line, at least one word line, a plurality of plate lines, and at least one cell string having a node electrode, a pass transistor connected between the bit line and the node electrode and held in a conductive state or a nonconductive state in accordance with a voltage supplied to the word line, and a plurality of ferroelectric capacitors having first electrodes commonly connected to the node electrode and other electrodes connected to different plate lines; the second memory includes a random accessible write back type cache memory; and the first memory is accessed via the second memory.

Preferably, the second memory includes a dynamic or static RAM.

Alternatively, the memory system is provided with the function of transferring in a block all of the data in units of memory strings sharing the node electrode in the first memory to the second memory.

Alternatively, the memory system is provided with the function of transferring in a block all of the data in units of cell units including a plurality of memory strings sharing the plate lines in the first memory to the second memory.

Alternatively, the memory system is provided with the function of transferring in a block all of the data in units of memory strings sharing the node electrode in the first memory from the second memory to the first memory.

Alternatively, the memory system is provided with the function of transferring in a block all of the data in units of cell units including a plurality of memory strings sharing the plate lines in the first memory from the second memory to the first memory together.

Alternatively, the first memory has the function of omitting re-storage of data into an accessed ferroelectric capacitor when reading the data.

According to a second aspect of the present invention, there is provided a memory device comprising at least one bit line; at least one word line; a plurality of plate lines; and at least one cell string having a node electrode, a pass transistor connected between the bit line and the node electrode and held in a conductive state or a nonconductive state in accordance with a voltage supplied to the word line, and a plurality of ferroelectric capacitors having first electrodes commonly connected to the node electrode and other electrodes connected to different plate lines; and having the function of omitting a re-storage of data into an accessed ferroelectric capacitor when reading data.

According to a third aspect of the present invention, there is provided a memory device having a first memory region and a second memory region, wherein the first memory region has at least one bit line, at least one word line, a plurality of plate lines, and at least one cell string having a node electrode, a pass transistor connected between the bit line and the node electrode and held in a conductive state or a nonconductive state in accordance with a voltage supplied to the word line, and a plurality of ferroelectric capacitors having first electrodes commonly connected to the node electrode and other electrodes connected to different plate lines; and the second memory region includes a random accessible memory connected to the same bit line as that for the first memory region and has the function of transferring at least part of the data from the first memory region to the second memory region.

Preferably, the memory device is provided with the function of transferring in a block all of the data in units of memory strings sharing the node electrode in the first memory region to the second memory.

Alternatively, the memory device is provided with the function of transferring in a block all of the data in units of cell units including a plurality of memory strings sharing the plate lines in the first memory region to the second memory.

Alternatively, the memory device is provided with the function of transferring in a block all of the data in units of memory strings sharing the node electrode in the first memory region from the second memory to the first memory.

Alternatively, the memory device is provided with the function of transferring in a block all of the data in units of cell units including a plurality of memory strings sharing the plate lines in the first memory region from the second memory to the first memory together.

Alternatively, the memory device further comprises a sense amplifier connected to each bit line and a latch circuit connected to each bit line and has the function of enabling access to data stored in the latch circuit from the outside while transferring data between the first memory region and the second memory region.

Alternatively, the randomly accessibly memory of the second memory region includes capacitors as storage elements, and insulation films or ferroelectric films of cell capacitors forming the second memory region are formed simultaneously with at least part of the ferroelectric films of the cell capacitors forming the first memory region.

According to the present invention, the data of the cross point type ferroelectric memory is accessed via a write back type cache memory.

Due to this, it becomes possible to freely access the data in the cache memory at random. At the same time, the cross point type memory is accessed only at the time of miss hit, and the number of data rewrites can be greatly reduced.

Further, data is transferred between the cross point type ferroelectric memory and the cache memory in units of at least the memory strings or units sharing the plate lines. Due to this, the cross point type memory side is always accessed in blocks of units.

Accordingly, the upper limit of the number of disturbances can be easily controlled.

Further, by suitably building in the above cache memory in the cross point type ferroelectric memory, the system performance can be further improved.

For example, the cache memory is made a DRAM and connected to the bit line the same as that for the memory unit of the cross point type ferroelectric memory.

The data of the DRAM is usually accessed from the outside. Due to this, the selected data of the selected unit group can be transferred directly to the DRAM in a block while keeping the area overhead to a minimum and therefore the overhead accompanying data transfer at the time of a miss hit can be greatly reduced.

Further, by forming the capacitor insulation film of the DRAM simultaneously with the ferroelectric film of at least part of the memory unit in the main memory, a miniature DRAM can be mounted without increasing the number of production steps, and the increase of the chip area accompanying the mounting of the cache can be suppressed.

Further, when the cache memory is made not by a DRAM, but by an FeRAM wherein each capacitor is separated by a transistor, the capacitor area can be reduced by the amount of use of a polarization inversion signal and therefore the overhead of the chip area is further reduced.

Further, if data is transferred between the DRAM (FeRAM) region and the cross point type ferroelectric memory region in units of unit arrays, since the cross point type ferroelectric memory region is always accessed in units of unit arrays, the upper limit of the disturbances can be easily set.

Further, by separately providing a latch in addition to the sense amplifier corresponding to each bit line, it becomes possible to transfer data between the cross point type memory region and the DRAM region while accessing data stored in the latches from the outside and thereby improve the usage efficiency of the memory.

Accordingly, if employing the present invention, it is possible to make the most of the non-volatility and high integration of the cross point type ferroelectric memory while improving the random accessibility and reducing the number of rewrites. By this, it becomes possible to greatly increase the range of applications of this memory.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Preferred embodiments of the present invention will be described in detail below while referring to the attached figures.

First Embodiment

Figure 1:
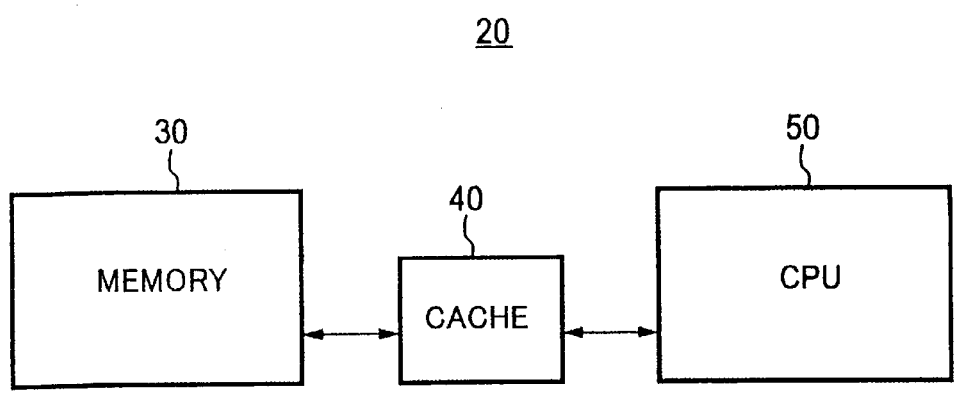
FIG. 1 is a block diagram of a memory system employing a memory device according to a first embodiment of the present invention.
Figure 2:
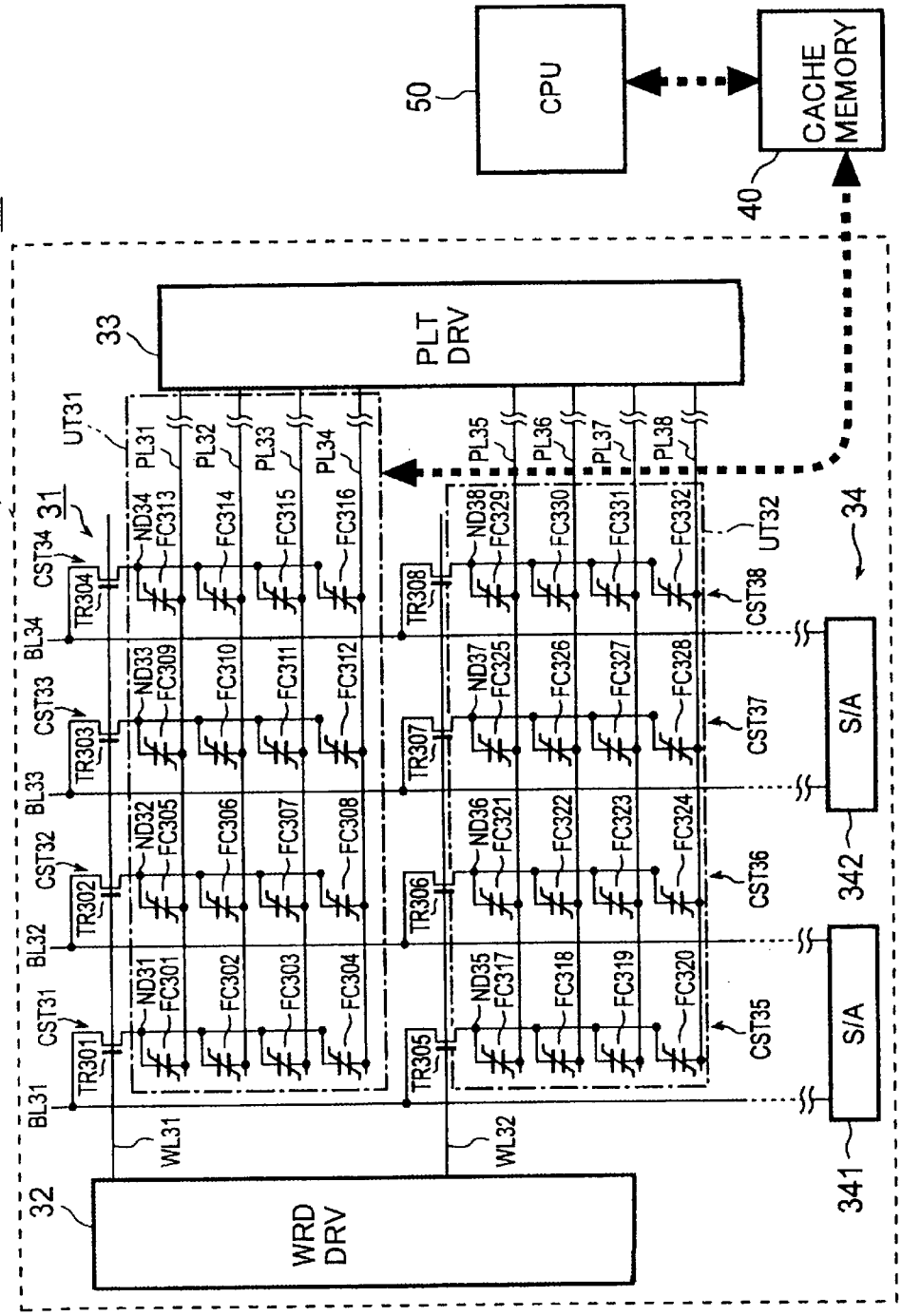
FIG. 2 is a circuit diagram of a memory system employing a memory device according to a first embodiment of the present invention.

FIG. 1 is a block diagram of a memory system employing a memory device according to a first embodiment of the present invention. FIG. 2 is a circuit diagram of a memory system employing a memory device according to a first embodiment of the present invention.

The memory system 20 has, as shown in FIG. 1 and FIG. 2, a cross point type ferroelectric memory (hereinafter, referred to as a main memory) 30 serving as the first memory, a write back type cache memory 40 serving as the second memory, and a CPU 50.

The memory device according to the present invention is configured by the main memory 30 and the write back type cache memory 40.

Note that, the write back type cache memory 40 is comprised of a randomly accessible SRAM or DRAM.

In the memory system 20 employing the memory device according to the first embodiment, as shown in FIG. 1, the main memory 30, cache memory 40, and CPU 50 are comprised of different chips.

The main memory 30 has, as shown in FIG. 2, a memory cell array 31, word driver (WRD DRV) 32, plate driver (PLT DRV) 33, and sense amplifier (S/A) group 34.

In the memory cell array 31, a plurality of (32 in the present embodiment) ferroelectric capacitors FC301 to FC332 forming the memory cells are arranged in a matrix. The 32 ferroelectric capacitors forming the memory cells are divided into two cell units UT31 and UT32.

Note that, for a simplification of the figure, only two cell units are shown, but the memory cell array 31 is actually configured by arranging a plurality of cell units in a matrix.

The cell unit UT31 is divided into four cell strings CST31 to CST34.

The cell string CST31 is configured by a pass transistor TR301 comprised of an n-channel MOS transistor and ferroelectric capacitors FC301, FC302, FC303, and FC304 arranged in the same column.

In the cell string CST31, first electrodes of the ferroelectric capacitors FC301, FC302, FC303, and FC304 serving as a plurality of (four in the present embodiment) memory cells are commonly connected to one node electrode ND31 connected to a bit line BL31 via the pass transistor TR301.

The other electrodes of the ferroelectric capacitors FC301, FC302, FC303, and FC304 are connected to different plate lines PL31, PL32, PL33, and PL34 to enable data to be independently written in the ferroelectric capacitors FC301, FC302, FC303, and FC304 serving as the memory cells.

Note that, in the present embodiment, the data of the plurality of ferroelectric capacitors FC301, FC302, FC303, and FC304 sharing for example the node electrode ND31 is accessed continuously in a block.

The cell string CST32 is configured by a pass transistor TR302 comprised of an n-channel MOS transistor and ferroelectric capacitors FC305, FC306, FC307, and FC308 arranged in the same column.

In the cell string CST32, first electrodes of the ferroelectric capacitors FC305, FC306, FC307, and FC308 serving as the memory cells are commonly connected to one node electrode ND32 connected to a bit line BL32 via the pass transistor TR302.

The other electrodes of the ferroelectric capacitors FC305, FC306, FC307, and FC308 are connected to different plate lines PL31, PL32, PL33, and PL34 to enable data to be independently written in the ferroelectric capacitors FC305, FC306, FC307, and FC308 serving as the memory cells.

Note that, in the present embodiment, the data of the plurality of ferroelectric capacitors FC305, FC306, FC307, and FC308 sharing the node electrode ND32 is accessed out continuously in a block.

The cell string CST33 is configured by a pass transistor TR303 comprised of an n-channel MOS transistor and ferroelectric capacitors FC309, FC310, FC311, and FC312 arranged in the same column.

In the cell string CST33, first electrodes of the ferroelectric capacitors FC309, FC310, FC311, and FC312 as the memory cells are commonly connected to one node electrode ND33 connected to a bit line BL33 via the pass transistor TR303.

The other electrodes of the ferroelectric capacitors FC309, FC310, FC311, and FC312 are connected to different plate lines PL31, PL32, PL33, and PL34 to enable data to be independently written in the ferroelectric capacitors FC309, FC310, FC311, and FC312 as the memory cells.

Note that, in the present embodiment, the data of the plurality of ferroelectric capacitors FC309, FC310, FC311, and FC312 sharing the node electrode ND33 is accessed continuously in a block.

The cell string CST34 is configured by a pass transistor TR304 comprised of an n-channel MOS transistor and ferroelectric capacitors FC313, FC314, FC315, and FC316 arranged in the same column.

In the cell string CST34, the first electrodes of the ferroelectric capacitors FC313, FC314, FC315, and FC316 serving as the memory cells are commonly connected to one node electrode ND34 connected to a bit line BL34 via the pass transistor TR304.

The other electrodes of the ferroelectric capacitors FC313, FC314, FC315, and FC316 are connected to different plate lines PL31, PL32, PL33, and PL34 to enable data to be independently written in the ferroelectric capacitors FC313, FC314, FC315, and FC316 serving as the memory cells.

Note that, in the present embodiment, the data of the plurality of ferroelectric capacitors FC313, FC314, FC315, and FC316 sharing the node electrode ND34 is accessed continuously in a block.

The gate electrodes of the pass transistors TR301 to TR304 of the cell strings CST31 to CST34 are connected to a common word line WL31.

The cell unit UT32 is divided into four cell strings CST35 to CST38.

The cell string CST35 is configured by a pass transistor TR305 comprised of an n-channel MOS transistor and ferroelectric capacitors FC317, FC318, FC319, and FC320 arranged in the same column.

In the cell string CST35, first electrodes of the ferroelectric capacitors FC317, FC318, FC319, and FC320 serving as a plurality of (four in the present embodiment) memory cells are commonly connected to one node electrode ND35 connected to the bit line BL31 via the pass transistor TR305.

The other electrodes of the ferroelectric capacitors FC317, FC318, FC319, and FC320 are connected to different plate lines PL35, PL36, PL37, and PL38 to enable data to be independently written in the ferroelectric capacitors FC317, FC318, FC319, and FC320 serving as the memory cells.

Note that, in the present embodiment, the data of the plurality of ferroelectric capacitors FC317, FC318, FC319, and FC320 sharing for example the node electrode ND35 is accessed continuously in a block.

The cell string CST36 is configured by a pass transistor TR306 comprised of an n-channel MOS transistor and ferroelectric capacitors FC321, FC322, FC323, and FC324 arranged in the same column.

In the cell string CST36, first electrodes of the ferroelectric capacitors FC321, FC322, FC323, and FC324 as the memory cells are commonly connected to one node electrode ND36 connected to a bit line BL32 via the pass transistor TR306.

The other electrodes of the ferroelectric capacitors FC321, FC322, FC323, and FC324 are connected to different plate lines PL35, PL36, PL37, and PL38 to enable data to be independently written in the ferroelectric capacitors FC321, FC322, FC323, and FC324 serving as the memory cells.

Note that, in the present embodiment, the data of the plurality of ferroelectric capacitors FC321, FC322, FC323, and FC324 sharing the node electrode ND36 is accessed continuously in a block.

The cell string CST37 is configured by a pass transistor TR307 comprised of an n-channel MOS transistor and ferroelectric capacitors FC325, FC326, FC327, and FC328 arranged in the same column.

In the cell string CST37, first electrodes of the ferroelectric capacitors FC325, FC326, FC327, and FC328 as the memory cells are commonly connected to one node electrode ND37 connected to the bit line BL33 via the pass transistor TR307.

The other electrodes of the ferroelectric capacitors FC325, FC326, FC327, and FC328 are connected to different plate lines PL35, PL36, PL37, and PL38 to enable data to be independently written in the ferroelectric capacitors FC325, FC326, FC327, and FC328 as the memory cells.

Note that, in the present embodiment, the data of the plurality of ferroelectric capacitors FC325, FC326, FC327, and FC328 sharing the node electrode ND37 is accessed continuously in a block.

The cell string CST38 is configured by a pass transistor TR308 comprised of an n-channel MOS transistor and ferroelectric capacitors FC329, FC330, FC331, and FC332 arranged in the same column.

In the cell string CST38, first electrodes of the ferroelectric capacitors FC329, FC330, FC331, and FC332 serving as the memory cells are commonly connected to one node electrode ND38 connected to the bit line BL34 via the pass transistor TR308.

The other electrodes of the ferroelectric capacitors FC329, FC330, FC331, and FC332 are connected to different plate lines PL35, PL36, PL37, and PL38 to enable data to be independently written in the ferroelectric capacitors FC329, FC330, FC331, and FC332 as the memory cells.

Note that, in the present embodiment, the data of the plurality of ferroelectric capacitors FC329, FC330, FC331, and FC332 sharing the node electrode ND38 is accessed continuously in a block.

The gate electrodes of the pass transistors TR305 to TR308 of the cell strings CST35 to CST38 are connected to the common word line WL32.

A word driver 32 supplies for example the power supply voltage $V_{cc}+\alpha$ ($\alpha$ is a voltage not less than the threshold voltage Vth of the pass transistor, for example 1V) to the addressed word line, i.e., WL31 or WL32 in the example of FIG. 2, and holds the pass transistors in the conductive state in unit of cell units.

A plate driver 33 supplies the plate lines PL31 to PL34 or PL35 to PL38 addressed at the time of data access with a predetermined voltage 0V or $V_{cc}$ to enable writing or reading of the ferroelectric capacitors as the addressed memory cells and supplies the unselected plate lines with a predetermined voltage $V_{cc}/2$.

Note that, as explained above, the memory cell array 31 is selectively accessed in units of cell units (units of word lines). The plurality of (four in the present embodiment) ferroelectric capacitors connected to one node inside the cell string are accessed in a block continuously, therefore the four plate lines PL31 to PL34 and PL35 to PL38 are continuously addressed.

The sense amplifier group 34 includes a sense amplifier 341 to which the bit lines BL31 and BL32 are connected and a sense amplifier 342 to which the bit lines BL33 and BL34 are connected.

The sense amplifiers 341 and 342 latch and amplify the data read to the bit lines BL31 to BL34 at the time of writing or time of reading.

Further, in the main memory 30, a not illustrated column driver selects the sense amplifiers 341 and 342 in accordance with the address designation, outputs read data latched in the sense amplifiers, supplies write data to the corresponding sense amplifiers, etc.

Note that, in the main memory 30, the bit line BL31 and bit line BL32 and the bit line BL33 and bit line BL34 form bit line pairs. A reference potential is given to one bit line of each bit line pair by a not illustrated dummy cell.

Below, an explanation will be given of characterizing functions of the memory system 20.

In the memory system 20, the main memory 30 is accessed via the write back type cache memory 40.

Namely, when accessing desired data, the CPU 50 first searches through the inside of the cache memory 40. If the data is there, it does not access the main memory 30.

When the desired data is not in the cache memory 40 (time of miss hit), the memory block including the desired data is transferred from the main memory 30 to the cache memory 40.

If there is no vacancy inside the cache memory 40 at that time, part of the group of the stored data is discarded and that data is written back to its original position in the main memory 30.

The above operation applies to writing data in the cache memory 40 as well. That is, if the desired data is in the cache memory 40, the main memory 30 is not accessed.

Accordingly, in order to realize the present operation, the cache memory 40 is comprised of a write back type different from the write through type wherein the data is always written back to the main memory 30 at the time of writing.

In the present memory system 20, when the cache memory 40 includes the desired data, only the cache memory 40 is accessed. Accordingly, the access at that time appears to be random access.

Further, as explained above, at the time of a hit, the main memory 30 is not accessed. Accordingly, the total number of accesses to the main memory 30 can be reduced, the number of rewrites is reduced, and the lifetime of the memory can be prolonged.

Further, in the memory system 20, data is transferred between the cache memory 40 and the main memory 30 in blocks in units of capacitor groups disturbing each other.

Namely, data is transferred in blocks in units of for example the cell units UT31 and UT32 sharing the cell strings CST31 to CST34 and CST35 to CST38 in the main memory 30 or the plate lines PL31 to PL34 and PL35 to PL38.

Due to this, the main memory 30 is always accessed in units corresponding to the cell units UT31 and UT32.

Accordingly, when any data is desired, all cell capacitors which would be disturbed at the time of the access are simultaneously accessed, and each cell capacitor is refreshed at least one time.

As a result, so far as data is accessed in the above units, the upper limit of the number of disturbances can be guaranteed for any cell capacitor, so it becomes possible to restrict deterioration.

Further, in the memory system 20, the main memory 30 does not perform a re-storage operation, but performs only a read operation.

The data read from the main memory 30 is destroyed when read out, so in a general ferroelectric memory, a restorage operation is always performed after a read operation.

Contrary to this, by providing a restorage omitting function as in the main memory 30 in the memory system 20, the data is transferred from the main memory 30 to the cache memory 40 at a high speed without waste and further it becomes able to quickly proceed to the next transfer.

The data is destroyed at the main memory 30 side, but is stored at the cache memory 40 side.

The data is always written back to the main memory 30 when the data is discarded at the cache memory 40 side in the future.

Accordingly, the data is not lost in actual usage.

Since the data is not uselessly restored in the main memory 30 in the memory system 20, the number of rewrites can be cut in half.

Note that when using such a function, it is preferable to add the function of sensing the drop in the power supply voltage at the time the power is turned off and automatically write back the data in the cache memory 40 to the main memory 30.

Further, in the memory system 20, the read operation from the main memory 30 equalizes for example the bit lines BL31 and BL32 of FIG. 2 to the ground level to bring them to the floating state, then drives the word line WL31 by the word driver 32 to place the pass transistors TR301 and TR302 of the cell strings CST31 and CST32 in the conductive state and give a positive voltage pulse to for example the plate line PL31.

At that time, the polarization of the ferroelectric films in the selected capacitors FC301 and FC305 inverts the "1" data to a direction the same as holding "0", that is, a weak "0" state.

After taking out the data in this way, it is also possible to return the bit lines BL31 and BL32 to the ground level and deliberately complete the writing of "0" data to all cells read.

If performing such processing, when writing back the data, it is sufficient to just write the "1" data in the desired cells. Accordingly, the write operation can be simplified and speeded up.

As explained above, according to the first embodiment, since the data of the cross point type main memory (ferroelectric memory) 30 is accessed via the write back type cache memory 40, the data in the cache memory 40 can be freely randomly accessed and, the cross point type main memory 30 is accessed only at the time of a miss hit, so the number of data rewrites can be greatly reduced.

Further, since data is transferred between the cross point type ferroelectric memory 30 and the cache memory 40 in blocks in units of the cell units UT31 and UT32 sharing the cell strings CST31 to CST34 and CST35 to CST38 or the plate lines PL31 to PL34 and PL35 to PL38, the cross point type ferroelectric memory 30 side is always accessed in blocks by the cell units UT31 and UT32.

Accordingly, the upper limit of the number of disturbances can be easily controlled.

Second Embodiment

Figure 3:
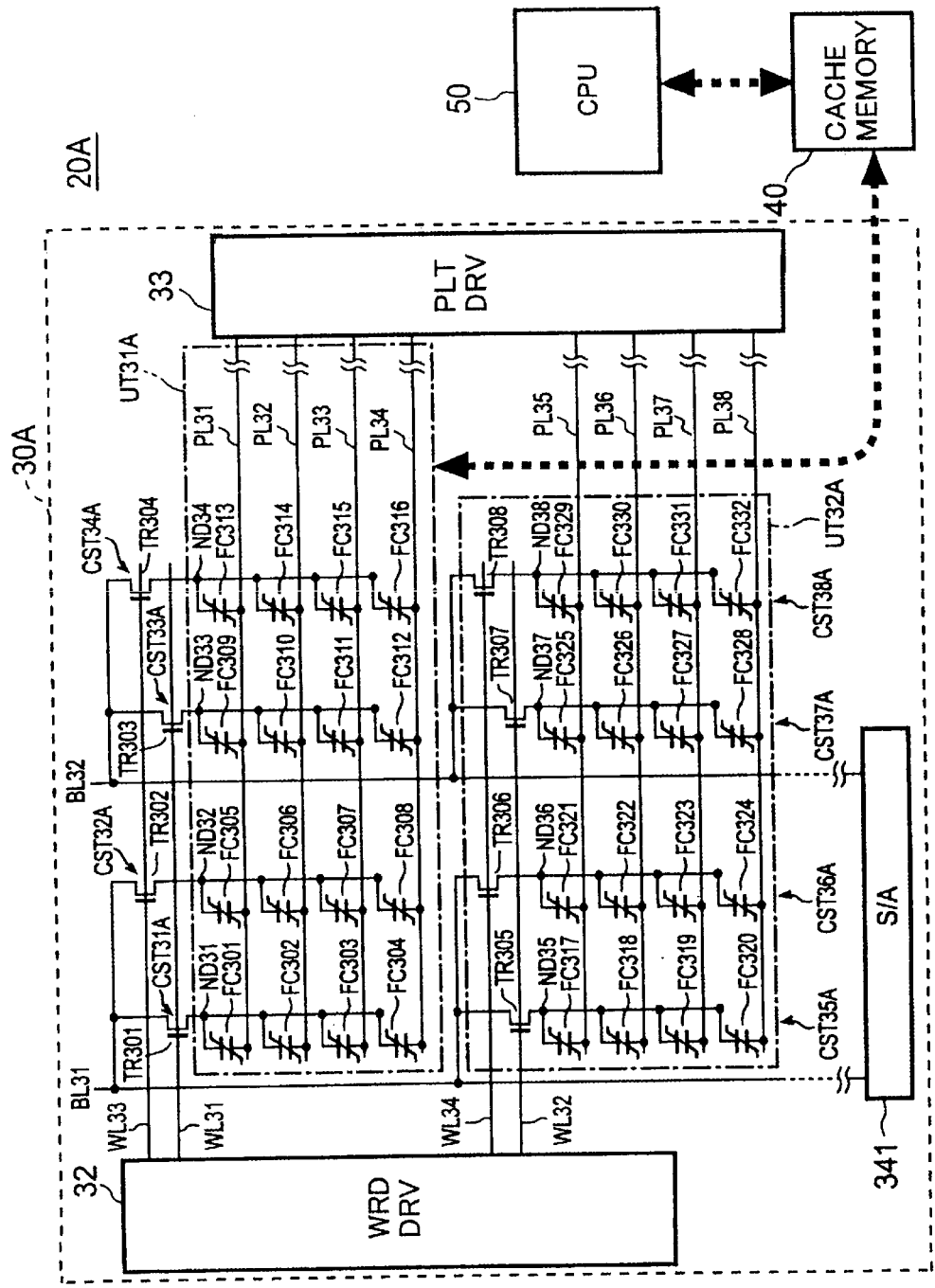
FIG. 3 is a circuit diagram of a memory system employing a memory device according to a second embodiment of the present invention.

FIG. 3 is a circuit diagram of a memory system employing a memory device according to a second embodiment of the present invention.

The difference of the second embodiment from the first embodiment resides in that the configuration of the cross point type ferroelectric memory, that is, the main memory.

In the first embodiment, in the memory cell array, the cell strings arranged in different columns were connected to different bit lines BL31 to BL34, but in the second embodiment, the cell strings of two adjacent columns are connected to the same bit line.

Specifically, in a main memory 30A, as shown in FIG. 3, the node electrode ND31 of a cell string CST31A in a cell unit UT31A is connected via the pass transistor TR301 to the bit line BL31, and the node electrode ND32 of a cell string CST32A is connected via the pass transistor TR302 to the bit line BL31.

Similarly, the node electrode ND33 of a cell string CST33A in the cell unit UT31A is connected via the pass transistor TR303 to the bit line BL32, and the node electrode ND34 of a cell string CST34A is connected via the pass transistor TR304 to the bit line BL32.

Further, the gate of the pass transistor TR301 of the cell string CST31A and the gate of the pass transistor TR303 of the cell string CST33A are connected to a common word line WL31, and the gate of the pass transistor TR302 of the cell string CST32A and the gate of the pass transistor TR304 of the cell string CST34A are connected to a common word line WL33.

Further, the node electrode ND35 of a cell string CST35A in a cell unit UT32A is connected via the pass transistor TR305 to the bit line BL31, and the node electrode ND36 of a cell string CST36A is connected via the pass transistor TR306 to the bit line BL31.

Similarly, the node electrode ND37 of a cell string CST37A in the cell unit UT32A is connected via the pass transistor TR307 to the bit line BL32, and the node electrode ND38 of a cell string CST38A is connected via the pass transistor TR308 to the bit line BL32.

Further, the gate of the pass transistor TR305 of the cell string CST35A and the gate of the pass transistor TR307 of the cell string CST37A are connected to a common word line WL32, and the gate of the pass transistor TR306 of the cell string CST36A and the gate of the pass transistor TR308 of the cell string CST38A are connected to a common word line WL34.

When employing such a configuration, while one cell string connected to a common bit line, for example CST31A, is accessed, the other cell string CST32A is disturbed. Accordingly, the cell capacitors of units corresponding to the cell units disturb each other.

Therefore, in the second embodiment as well, in the same way as in the above first embodiment, the main memory 30A is accessed via the write back type cache memory 40.

At this time, the data is transferred between the main memory 30 and the cache memory 40 in blocks in units of the cell units UT31A and UT32A sharing the cell strings CST31A to CST34A and CST35A to CST38A or the plate lines PL31 to PL34 and PL35 to PL38.

Due to this, in the second embodiment as well, in the same way as the first embodiment, control of the number of disturbances becomes easy.

Third Embodiment

Figure 4:
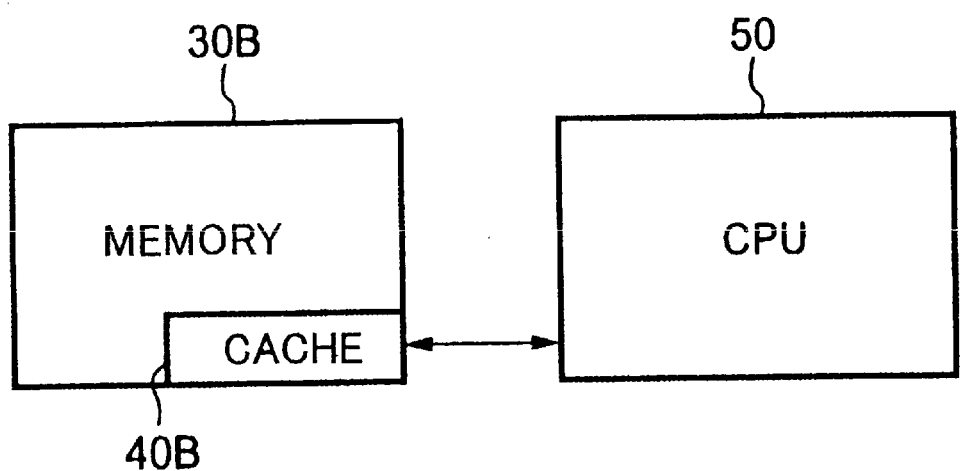
FIG. 4 is a circuit diagram of a memory system employing a memory device according to a third embodiment of the present invention.

FIG. 4 is a block diagram of a memory system employing a memory device according to a third embodiment of the present invention.

The difference of the third embodiment from the first and second embodiments is that instead of forming the cross point type ferroelectric memory serving as the first memory (referred to as the main memory) and the write back type cache memory serving as the second memory forming the memory device by different chips, they are integrally formed on the same chip.

Integrally forming the main memory 30B and the cache memory 40B is advantageous for increasing the speed of the data transfer between the main memory and the cache memory at the time of a miss hit.

Figure 5:
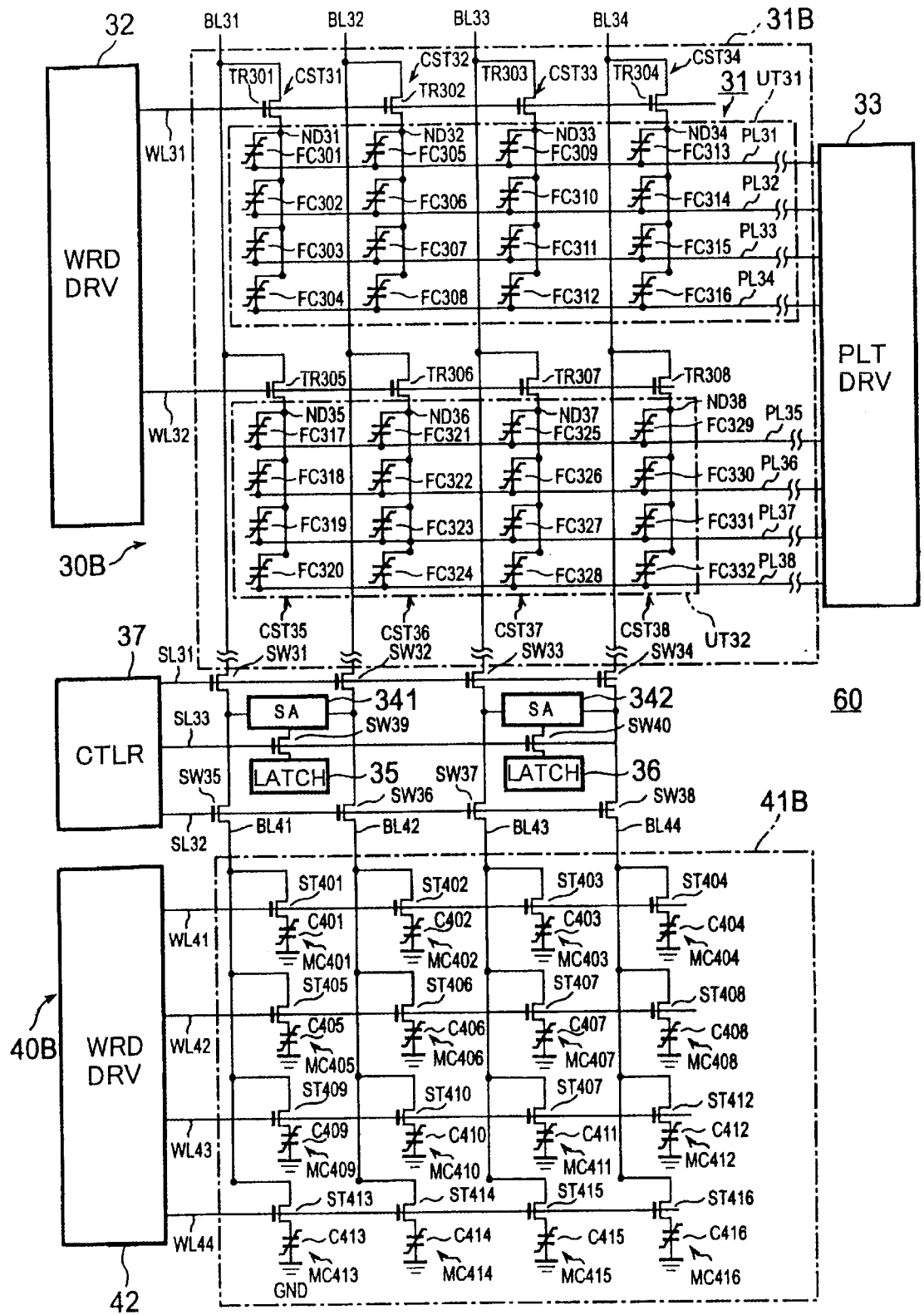
FIG. 5 is a circuit diagram of an example of the configuration of a memory device comprised of a main memory and a cache memory formed integrally according to the third embodiment of the present invention.
Figure 6:
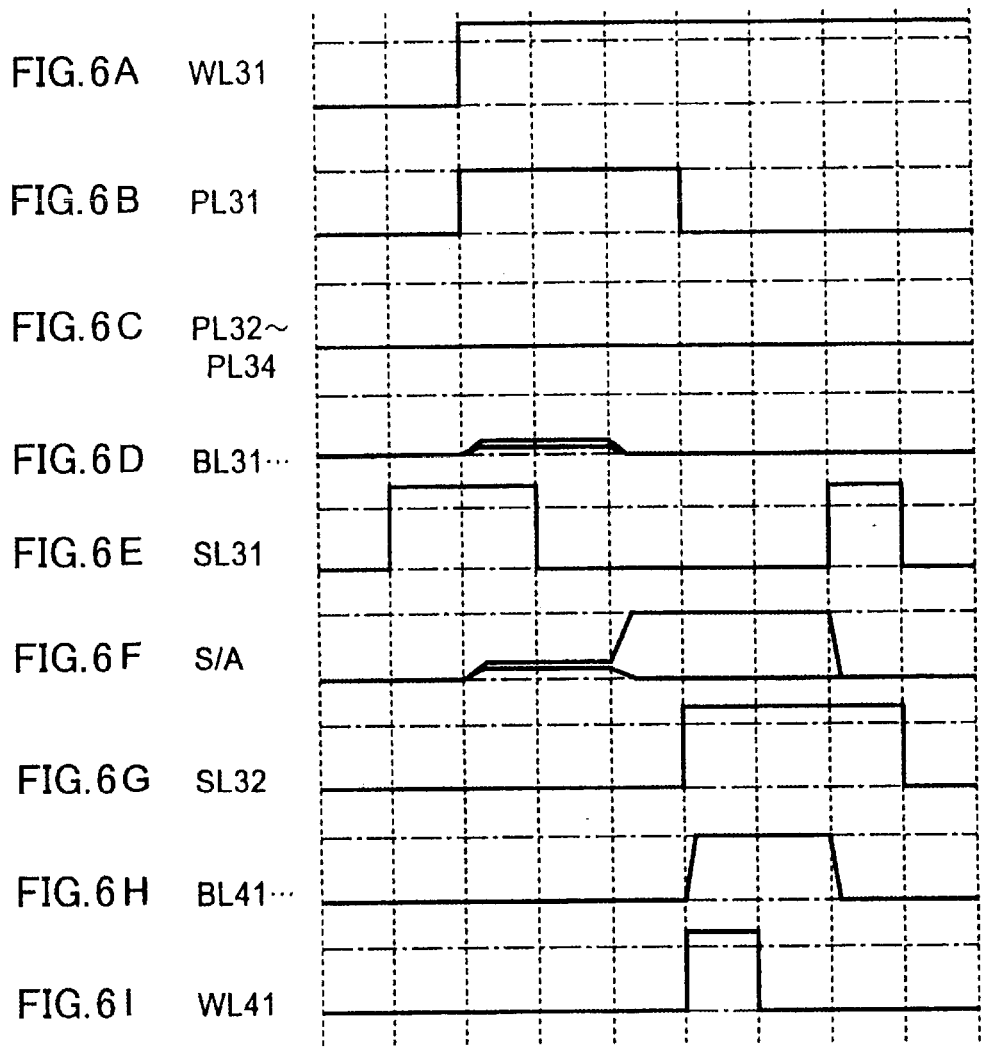
FIGS. 6A to 6I are timing charts showing an example of a data transfer operation between the two memory regions of the main memory and the cache memory via a sense amplifier, in particular, illustrating a transfer operation from the main memory to the DRAM cache memory and showing the steps of reading the data from the main memory and writing the same in the DRAM cache.
Figure 7:
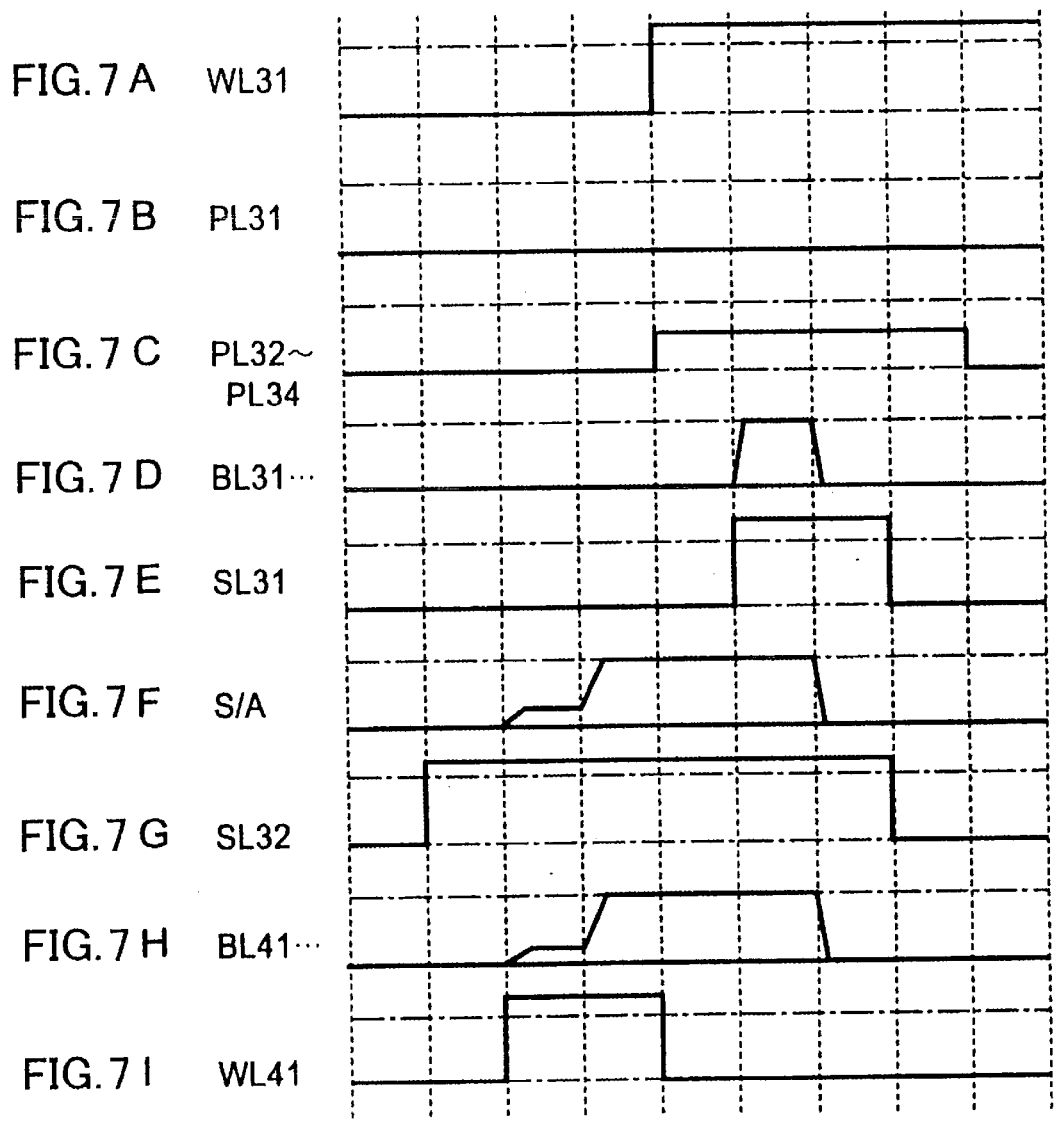
FIGS. 7A to 7I are timing charts showing an example of a data transfer operation between the two memory regions of the main memory and the cache memory via the sense amplifier, in particular illustrating a transfer operation from the DRAM cache memory to the main memory and showing the steps of reading the data from the DRAM cache memory and storing the same in the main memory.

FIG. 5 is a circuit diagram of an example of the configuration of a memory device comprised of the main memory 30B and the cache memory 40B formed integrally according to the third embodiment of the present invention.

In the memory device 60, as shown in FIG. 5, the main memory 30B and cache memory 40B are connected to the same bit lines BL31 to BL34 (in the cache memory 40B, represented as the bit lines BL41 to BL41) while straddling the sense amplifiers 341 and 342.

The configuration of the main memory 30B of FIG. 5 is basically the same as the configuration of the main memory 30 of FIG. 2, so a detailed explanation thereof is omitted here and same reference numerals are used for same components.

The main memory 30B of FIG. 5 further has the following configuration in addition to the configuration of the main memory 30B of FIG. 2.

Namely, the differential input/output of the sense amplifier 341 are connected from the n-channel MOS transistor via switches SW31 and SW32 to the bit lines BL31 and BL32, and the differential input/output of the sense amplifier 342 are connected from the n-channel MOS transistor via switches SW33 and SW34 to the bit lines BL33 and BL34.

Further, the differential input/output of the sense amplifier 341 are connected from the n-channel MOS transistor via switches SW35 and SW36 to the bit lines BL41 and BL42 on the cache memory 40B side, and the differential input/output of the sense amplifier 342 are connected from the n-channel MOS transistor via switches SW37 and SW38 to the bit lines BL43 and BL44 on the cache memory 40B side.

Further, the latch 35 is connected to the sense amplifier 341 from the n-channel MOS transistor via a switch SW39, and the latch 36 is connected to the sense amplifier 342 from the n-channel MOS transistor via a switch SW40.

Further, it has a controller (CTLR) 37 for controlling conduction of the switches SW31 to SW34, switches SW35 to SW38, and switches SW39 and SW40 in accordance with the operation mode.

The cache memory 40B is comprised, for example, of DRAM cells MC401 to MC416 comprised of selection transistors CST401 to CST416 and capacitors C401 to C416 having first electrodes terminated at the ground arranged in a four-row, four-column matrix.

The memory cells MC401, MC405, MC409, and MC413 arranged in the first column are connected via the selection transistors ST401, ST405, ST409, and ST413 to the bit line BL41 (BL31), the memory cells MC402, MC406, MC410, and MC414 arranged in the second column are connected via the selection transistors ST402, ST406, ST410, and ST414 to the bit line BL42 (BL32), the memory cells MC403, MC407, MC411, and MC415 arranged in the third column are connected via the selection transistors ST403, ST407, ST411, and ST415 to the bit line BL43 (BL33), and the memory cells MC404, MC408, MC412, and MC416 arranged in the fourth column are connected via the selection transistors ST404, ST408, ST412, and ST416 to the bit line BL44 (BL34).

Further, the gates of the selection transistors ST401 to ST404 of the memory cells MC401 to MC404 arranged in the first row are connected to the word line WL41, the gates of the selection transistors ST405 to ST408 of the memory cells MC405 to MC408 arranged in the second row are connected to the word line WL42, the gates of the selection transistors ST409 to ST412 of the memory cells MC409 to MC412 arranged in the third row are connected to the word line WL43, and the gates of the selection transistors ST413 to ST416 of the memory cells MC413 to MC416 arranged in the fourth row are connected to the word line WL44.

Further, the word lines WL41 to WL44 are driven by the word driver 42.

The cache memory 40B having such a configuration can be accessed from the outside at random.

The capacity of these DRAM cells coincides with the capacities of the cell units UT31 and UT32 corresponding to block transfer units between the two memory regions of the main memory 30B serving as the first memory and the cache memory 40B serving as the second memory.

Further, the word lines WL41 to WL44 for addressing the DRAM region (41B) are provided in a one-to-one correspondence with the plate lines PL31 to PL34 and PL35 to PL38 for addressing the interior of the cell units of the main memory 30B.

For example, the word lines WL41 to WL44 of the cache memory 40B correspond to the plate lines PL31 to PL34 of the cell unit UT31.

In the memory device 60, when data is accessed from the outside, if the data of the cell unit including the desired data has been transferred to the DRAM region 41B of the cache memory 40B, only the DRAM region 41B is accessed, and the memory cell array 31B of the main memory 30B (hereinafter, referred to as the memory region) is not accessed.

Accordingly, data can be randomly accessed from the outside like with a DRAM.

Further, the number of rewrites of the main memory region is reduced, and the lifetime is extended. Note that, at the time of the DRAM access, switches SW31 to SW34 connected to the main memory selection line SL31 is in the off state, and switches SW35 to SW38 connected to the DRAM selection line SL32 is in the on state.

On the other hand, when the desired data is not in the DRAM region 41B of the cache memory 40B, the data of the DRAM region 41B is continuously written back in a block to the cell unit in the original main memory 30B, and the data of the cell unit including the desired data is transferred continuously in a block to the DRAM region 41B of the cache memory 40B.

By employing a configuration where the DRAM region 41B of the cache memory 40B and the memory region 31B of the cross point type main memory 30B share a bit line as in the third embodiment, the data is transferred between the memory region 31B of the main memory 30B and the DRAM region 41B of the cache memory 40B in parallel via all bit lines in the memory region.

Accordingly, data can be transferred at an extremely high speed, and the overhead time at the time of miss hit can be reduced.

Further, by using a DRAM for the cache part in this way and integrally forming the array, the increase of the chip area accompanied with the incorporation of a cache memory can be greatly reduced.

Further, if forming the capacitor insulation film of the DRAM simultaneously with part of the ferroelectric film of the main memory array, a large capacity can be acquired by small capacitors, and the area occupied by the DRAM can be made further smaller.

Further, by terminating the capacitors of the DRAM at the ground, the capacitors receive an electric field in only one direction. Accordingly, inversion of polarization does not occur in the DRAM cache portion having the highest usage frequency, and deterioration of the dielectric property due to fatigue and insulation breakdown do not occur.

Note that it is also possible to configure the entire memory by a plurality of banks and access another bank while transferring data between the main memory 30B and the DRAM of the cache memory 40B.

Further, in the third embodiment, as explained above, latches 35 and 36 are separately connected to the sense amplifiers 341 and 342.

Due to this, for example, the data on the desired plate line is first read out to the sense amplifier at the time of a miss hit and stored in the latch.

By disconnecting the latches and the sense amplifiers by the switches SW39 and SW40 thereafter, it is also possible to make the latches and sense amplifiers act independently and further reduce the overhead at the time of a miss hit.

Namely, while accessing these latches from the outside, the sense amplifiers inside can be used to transfer data between the DRAM of the cache memory 40B and the main memory 30B.

FIGS. 6A to 6I and FIGS. 7A to 7I are timing charts showing examples of a data transfer operation between the two memory regions of the main memory and the cache memory via the sense amplifiers.

FIGS. 6A to 6I illustrate a transfer operation from the main memory 30B to the DRAM cache memory 40B and show the steps of reading data from the main memory and writing it into the DRAM cache.

Further, FIGS. 7A to 7I illustrate a transfer operation from the DRAM cache memory 40B to the main memory 30B and show the steps of reading data from the DRAM cache memory and re-storing it in the main memory.

Next, an explanation will be given of a transfer operation from the main memory 30B to the DRAM cache memory 40B with reference to FIGS. 6A to 6I.

First, the controller 37 drives the main memory region selection line SL31 to the power supply voltage $V_{cc}+\alpha$ to turn the switches SW31 to SW34 on and turning the switches SW35 to SW38 off by the DRAM region selection line SL32 so as to connect the sense amplifiers 341 and 342 to only the main memory 30.

Then, it equalizes the bit lines BL31 and BL32 (BL33 and BL34) to the ground level to place them in the floating state, drives the word line WL31 (WL32) to select the cell unit UI31, and gives a pulse to the plate line, for example PL31, connected to the desired data to read out the data.

Next, it switches the main memory region selection line SL31 to 0V to turn the switches SW31 to SW34 off, then activate the sense amplifiers 341 (342) and then drives the DRAM memory region selection line SL32 to the power supply voltage $V_{cc}+\alpha$ to turn the switches SW35 to SW38 on and transfer the data to the bit lines BL41 and BL42 (BL43 and BL44) of the DRAM region side of the cache memory 40B.

Here, it drives the DRAM word line WL41 corresponding to the selected plate line PL31 to transfer the data to the DRAM capacitor.

By repeating the above operation for all plate lines in the selected unit, all data in the cell unit UT31 is transferred to the DRAM region 41B of the cache memory 40B.

Note that, when transferring data from the main memory 30B to the DRAM region, the data is not re-stored in the main memory 30B.

Data is re-stored when writing back data from the DRAM region 41B of the cache memory 40B to the original region when a request for access from the outside does not hit data in the DRAM region.

Note that, in a read operation from the main memory 30B, the main bit lines BL31 to BL34 are equalized to the ground again after disconnecting the sense amplifiers, but the plate line PL32 still stays in the on state at this time.

By this, "0" is written into the selected capacitor. Accordingly, it is not necessary to write the "0" again at the time of the transfer for re-storage from the DRAM of the cache memory 40B to the main memory 30B. It is sufficient to write back only "1" to the desired capacitor.

Further, in the above operation, it is also possible to connect the latches 35 and 36 to the sense amplifiers and store the data after activating the sense amplifiers 341 and 342 and to separate the sense amplifiers from the latches, then start the output to the outside.

The latches and the sense amplifiers can independently operate, therefore the data can be transferred inside without problem even during data output.

Next, an explanation will be given of a transfer operation from the DRAM cache memory 40B to the main memory 30B with reference to FIGS. 7A to 7I.

First, the controller 37 sets the main memory region selection line SL31 to 0V to keep the switches SW31 to SW34 off as they are, drives the DRAM region selection line SL32 to the power supply voltage $V_{cc}+\alpha$ to turn the switches SW35 to SW38 on and thereby connect the sense amplifiers 341 and 342 to the DRAM region 41B of the cache memory 40B, and drives one WL41 of the DRAM word lines to read out the data.

It amplifies the data at the sense amplifiers 341 and 342, then drives the main memory region selection line SL31 to the power supply voltage $V_{cc}+\alpha$ to turn the switches SW31 to SW34 on and drives the word line WL31 of the main memory 30B to transfer the signal to for example the cell unit UT31 of the main memory 30B.

At this time, the selected plate line PL31 corresponding to the DRAM word line WL41 in the selection unit is fixed at the ground level, and the unselected plate lines PL32 to PL34 are fixed at ($\frac{1}{2}$) $V_{cc}$.

When and only when reading "1" from the DRAM by the above operation, the voltage $V_{cc}$ is supplied to only the capacitor on the selected plate line in the selected unit and "1" is written. The absolute values of the voltages supplied to the capacitors other than that are all ($\frac{1}{2}$) $V_{cc}$ or less, and the data of the other capacitors are held.

Note that, in the above example, ($\frac{1}{2}$) $V_{cc}$ was used for preventing disturbance for simplification of the explanation, but it is also possible to reduce the voltage supplied to the unselected capacitors to ($\frac{1}{3}$) $V_{cc}$ or less by bringing the unselected plate lines to ($\frac{2}{3}$) $V_{cc}$ and shifting the low level of the sense amplifier to ($\frac{1}{3}$) $V_{cc}$.

Fourth Embodiment

Figure 8:
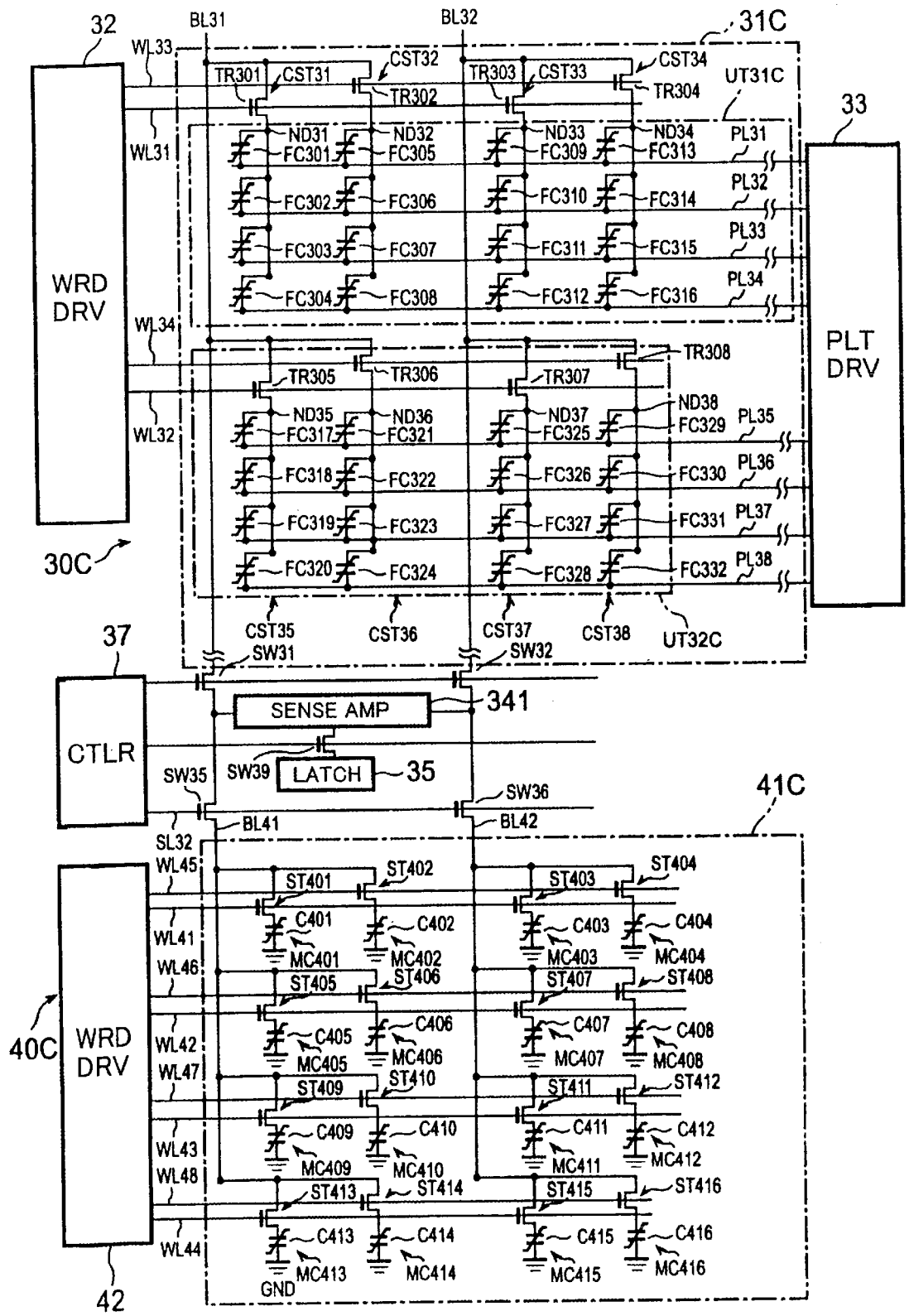
FIG. 8 is a circuit diagram of an example of the configuration of a memory device comprised of a main memory and cache memory formed integrally according to a fourth embodiment of the present invention.

FIG. 8 is a circuit diagram of an example of the configuration of a memory device comprised of a main memory and cache memory formed integrally according to a fourth embodiment of the present invention.

The difference of the fourth embodiment from the third embodiment resides in that, in contrast to the third embodiment wherein cell strings arranged in different columns were connected to different bit lines BL31 to BL34 in the memory cell array (memory region) of the main memory 30C, in the fourth embodiment, cell strings in two adjacent columns are connected to the same bit line, and, in accordance with this, in the DRAM region 41C of the cashe memory 40C, cell strings in two adjacent columns are connected to the same bit line.

Specifically, in the main memory 30C, as shown in FIG. 8, the node electrode ND31 of the cell string CST31 in the cell unit UT31C is connected via the pass transistor TR301 to the bit line BL31, and the node electrode ND32 of the cell string CST32 is connected via the pass transistor TR302 to the bit line BL31.

Similarly, the node electrode ND33 of the cell string CST33 in the cell unit UT31C is connected via the pass transistor TR303 to the bit line BL32, and the node electrode ND34 of the cell string CST34 is connected via the pass transistor TR304 to the bit line BL32.

Further, the gate of the pass transistor TR301 of the cell string CST31 and the gate of the pass transistor TR303 of the cell string CST33 are connected to a common word line WL31, and the gate of the pass transistor TR302 of the cell string CST32 and the gate of the pass transistor TR304 of the cell string CST34 are connected to a common word line WL33.

Further, the node electrode ND35 of the cell string CST35 in the cell unit UT32C is connected via the pass transistor TR305 to the bit line BL31, and the node electrode ND36 of the cell string CST36 is connected via the pass transistor TR306 to the bit line BL31.

Similarly, the node electrode ND37 of the cell string CST37 in the cell unit UT32C is connected via the pass transistor TR307 to the bit line BL32, and the node electrode ND38 of the cell string CST38 is connected via the pass transistor TR308 to the bit line BL32.

Further, the gate of the pass transistor TR305 of the cell string CST35 and the gate of the pass transistor TR307 of the cell string CST37 are connected to a common word line WL32, and the gate of the pass transistor TR306 of the cell string CST36 and the gate of the pass transistor TR308 of the cell string CST38 are connected to a common word line WL34.

Further, in the DRAM region of the cache memory 40C, the memory cells MC401, MC405, MC409, and MC413 arranged in the first column are connected to the bit line BL41 (BL31) via the selection transistors ST401, ST405, ST409, and ST413, the memory cells MC402, MC406, MC410, and MC414 arranged in the second column are connected to the bit line BL41 (BL31) via the selection transistors ST402, ST406, ST410, and ST414, the memory cells MC403, MC407, MC411, and MC415 arranged in the third column are connected to the bit line BL42 (BL32) via the selection transistors ST403, ST407, ST411, and ST415, and the memory cells MC404, MC408, MC412, and MC416 arranged in the fourth column are connected to the bit line BL42 (BL32) via the selection transistors ST404, ST408, ST412, and ST416.

Further, the gates of the selection transistors ST401 and ST403 of the memory cells MC401 and MC403 arranged in the first row are connected to the word line WL41, the gates of the selection transistors ST402 and ST404 of the memory cells MC402 and MC404 arranged in the first row are connected to the word line WL45, the gates of the selection transistors ST405 and ST407 of the memory cells MC405 and MC407 arranged in the second row are connected to the word line WL42, the gates of the selection transistors ST406 and ST408 of the memory cells MC406 and MC408 arranged in the second row are connected to the word line WL46, the gates of the selection transistors ST409 and ST411 of the memory cells MC409 and MC411 arranged in the third row are connected to the word line WL43, the gates of the selection transistors ST410 and ST412 of the memory cells MC410 and MC412 arranged in the third row are connected to the word line WL47, the gates of the selection transistors ST413 and ST415 of the memory cells MC413 and MC415 arranged in the fourth row are connected to the word line WL44, and the gates of the selection transistors ST414 and ST416 of the memory cells MC414 and MC416 arranged in the fourth row are connected to the word line WL48.

When employing such a configuration, the block units corresponding to the cell units sharing the plate line or cell string disturb each other.

Accordingly, the block units are used as the transfer units, and a DRAM region 41C of the cache memory 40C having the same capacity as the units is connected to the main memory 30C corresponding to each bit line.

Further, the word lines WL41 to WL48 for selecting the memory cell of the DRAM region 41C of the cache memory 40C correspond to the matrix of the word lines and plate lines in the cell unit of the main memory 30C.

Namely, 2×4=8 word lines WL41 to WL48 among word lines of the DRAM region 41C correspond to for example two word lines WL41 and WL43 and four plate lines PL31 to PL34 of the cell unit UT31C.

Further, in the fourth embodiment, when the desired data is in the DRAM region 41C, the memory region 31C of the main memory 30C is not accessed.

At the time of a miss hit, a group of data of an amount corresponding to a cell unit is written back to the original memory capacitors from the DRAM region 41C of the cache memory 40C, and the group of data of the cell unit including the desired data is transferred from the memory region 31C of the main memory 30C to the DRAM region 41C of the cache memory 40C.

Both of the memories of the third and fourth embodiments function like DRAMs having the capacity of the main memory from the outside and can be accessed randomly in the same way as DRAMs.

Note, when the DRAM region does not contain the desired data, data has to be transferred between the DRAM and the main memory, and it is necessary to wait a suitable time. Even in such a case, however, access to other banks is possible in parallel.

Further, when separately connecting latches to the sense amplifiers as explained above, even when transferring data internally, the requested data can be taken outside at a high speed.

Further, the cache region was made a DRAM, but even making it an FeRAM having a similar configuration, the random accessibility is similarly improved. In this case, by driving the capacitors by the plate lines, polarization charges can be utilized for the signal. Further, the capacitors are made smaller and the area occupied by the cache portion can be made smaller.

Note, the cache region deteriorates along with rewriting, therefore a DRAM is suited for applications with high access frequency.

Fifth Embodiment

Figure 9:
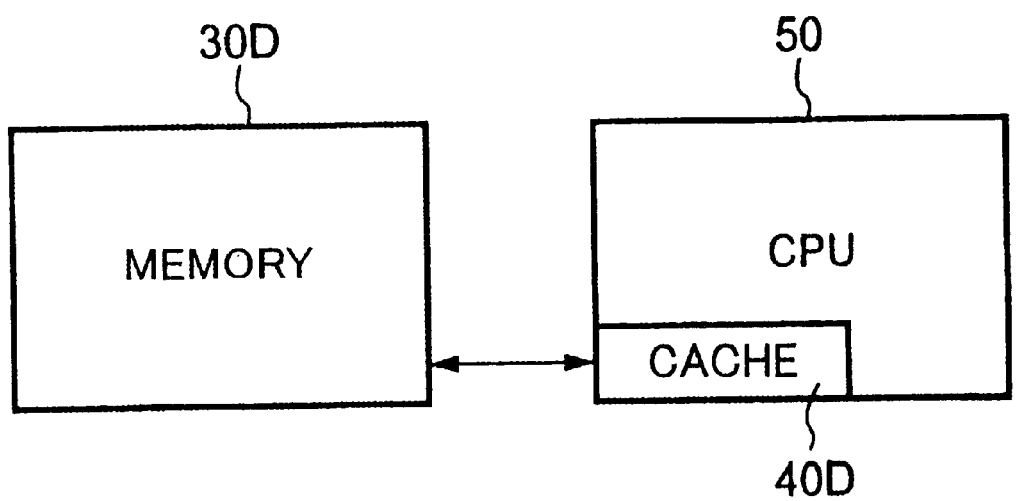
FIG. 9 is a block diagram of a memory system employing a memory device according to a fifth embodiment of the present invention.
Figure 10:
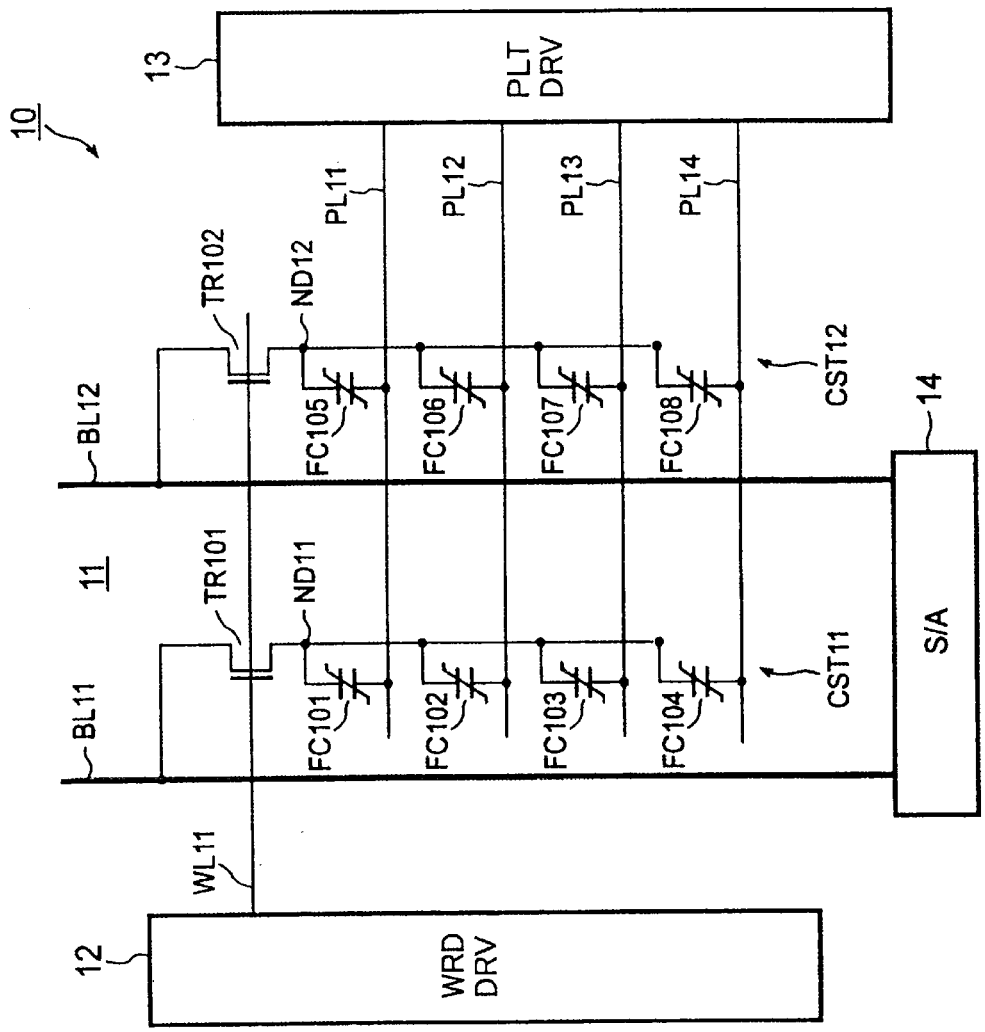
FIG. 10 is a circuit diagram of an example of a cross point type ferroelectric memory of the related art.

FIG. 9 is a block diagram of a memory system employing a memory device according to a fifth embodiment of the present invention.

The difference of the fifth embodiment from the first embodiment resides in that, instead of forming the cache memory 40D on a different chip, it is integrally formed on the same chip as the CPU 50.

The rest of the configuration is similar to that of the first embodiment explained above.

According to the fifth embodiment, similar effects to the effects of the first embodiment can be obtained.

Further, in addition to the above embodiments, there are variations in the gain type etc. in the main portion of the cross point type memory, but the present invention can be similarly applied to these.

In the embodiments explained above, the description was given of the case where four ferroelectric capacitors were connected to the same node, but any number of ferroelectric capacitors may be connected so far as the number is two or more.

In general, the larger the number of the ferroelectric capacitors connected to the same node, the higher the storage density, but greater the number of disturbances, so the data more easily deteriorates.

Further, the bit line potential slightly fluctuates at the time of reading data. Therefore, if the number of capacitors connected to the same node is large, a charges of that extent of fluctuation will be discharged from there and become noise.

Accordingly, the number of capacitors connected to the same node is desirably not more than eight, that is, two to eight.

Summarizing the effects of the invention, as explained above, according to the present invention, it is possible to make the most of the non-volatility and high integration of a cross point type ferroelectric memory while improving the random accessibility, reducing the number of rewrites, and facilitating the control of the upper limit of the number of disturbances.

As a result, there is the advantage that stable access without destruction of data can be guaranteed.

While the invention has been described with reference to specific embodiments chosen for purpose of illustration, it should be apparent that numerous modifications could be made thereto by those skilled in the art without departing from the basic concept and scope of the invention.

What is claimed is:

1. A memory system having a first memory and a second memory, wherein the first memory has:

at least one bit line, at least one word line, a plurality of plate lines, and at least one cell string having a node electrode, a pass transistor connected between the bit line and the node electrode and held in a conductive state or a nonconductive state in accordance with a voltage supplied to the word line, and a plurality of ferroelectric capacitors having first electrodes commonly connected to the node electrode and other electrodes connected to different plate lines;

the second memory includes a random accessible write back type cache memory; and the first memory is accessed via the second memory, wherein the first memory has the function of omitting re-storage of data into an accessed ferroelectric capacitor when reading the data.

2. A memory system as set forth in claim 1, wherein the second memory includes a dynamic or static RAM.

3. A memory system as set forth in claim 1, comprises the function of transferring in a block all of the data in units of memory strings sharing the node electrode in the first memory to the second memory.

4. A memory system as set forth in claim 1, comprises the function of transferring in a block all of the data in units of cell units including a plurality of memory strings sharing the plate lines in the first memory to the second memory.

5. A memory system as set forth in claim 1, comprises the function of transferring in a block all of the data in units of memory strings sharing the node electrode in the first memory from the second memory to the first memory.

6. A memory system as set forth in claim 1, comprises the function of transferring in a block all of the data in units of cell units including a plurality of memory strings sharing the plate lines in the first memory from the second memory to the first memory together.

7. A memory device comprising:

at least one bit line;

at least one word line;

a plurality of plate lines; and at least one cell string having a node electrode, a pass transistor connected between the bit line and the node electrode and held in a conductive state or a nonconductive state in accordance with a voltage supplied to the word line, and a plurality of ferroelectric capacitors having first electrodes commonly connected to the node electrode and other electrodes connected to different plate lines; and having the function of omitting a re-storage of data into an accessed ferroelectric capacitor when reading data.

8. A memory device having a first memory region and a second memory region, wherein:

the first memory region has:

at least one bit line, at least one word line, a plurality of plate lines, and at least one cell string having a node electrode, a pass transistor connected between the bit line and the node electrode and held in a conductive state or a nonconductive state in accordance with a voltage supplied to the word line, and a plurality of ferroelectric capacitors having first electrodes commonly connected to the node electrode and other electrodes connected to difference plate lines; and the second memory region:

includes a random accessible memory connected to the same bit line as that for the first memory region and has the function of transferring at least part of the data from the first memory region to the second memory region, and further comprising, a sense amplifier connected to each bit line and a latch circuit connected to each bit line and has the function of enabling access to data stored in the latch circuit from the outside while transferring data between the first memory region and the second memory region.

9. A memory device as set forth in claim 8, further comprises the function of transferring in a block all of the data in units of memory strings sharing the node electrode in the first memory region to the second memory.

10. A memory device as set forth in claim 8, further comprises the function of transferring in a block all of the data in units of cell units including a plurality of memory strings sharing the plate lines in the first memory region to the second memory.

11. A memory device as set forth in claim 8, further comprises the function of transferring in a block all of the data in units of memory strings sharing the node electrode in the first memory region from the second memory to the first memory.

12. A memory device as set forth in claim 8, further comprises the function of transferring in a block all of the data in units of cell units including a plurality of memory strings sharing the plate lines in the first memory region from the second memory to the first memory together.

13. A memory device as set forth in claim 8, wherein the randomly accessibly memory of the second memory region includes capacitors as storage elements, and insulation films or ferroelectric films of cell capacitors forming the second memory region are formed simultaneously with at least part of the ferroelectric films of the cell capacitors forming the first memory region.

14. A memory device having a first memory region and a second memory region, wherein:

the first memory region has:

at least one bit line, at least one word line, a plurality of plate lines, and at least one cell string having a node electrode, a pass transistor connected between the bit line and the node electrode and held in a conductive state or a nonconductive state in accordance with a voltage supplied to the word line, and a plurality of ferroelectric capacitors having first electrodes commonly connected to the node electrode and other electrodes connected to difference plate lines; and the second memory region:

includes a random accessible memory connected to the same bit line as that for the first memory region and has the function of transferring at least part of the data from the first memory region to the second memory region, wherein the randomly accessibly memory of the second memory region includes capacitors as storage elements, and insulation films or ferroelectric films of cell capacitors forming the second memory region are formed simultaneously with at least part of the ferroelectric films of the cell capacitors forming the first memory region.

15. A memory device as set forth in claim 14, further comprises the function of transferring in a block all of the data in units of memory strings sharing the node electrode in the first memory region to the second memory.

16. A memory device as set forth in claim 14, further comprises the function of transferring in a block all of the data in units of cell units including a plurality of memory strings sharing the plate lines in the first memory region to the second memory.

17. A memory device as set forth in claim 14, further comprises the function of transferring in a block all of the data in units of memory strings sharing the node electrode in the first memory region from the second memory to the first memory.

18. A memory device as set forth in claim 14, further comprises the function of transferring in a block all of the data in units of cell units including a plurality of memory strings sharing the plate lines in the first memory region from the second memory to the first memory together.

* * * * *